Patented Dec. 7, 1926.  1,609,329

UNITED STATES PATENT OFFICE.

WILLIAM CHITTENDEN TAYLOR, OF CORNING, NEW YORK, ASSIGNOR TO CORNING GLASS WORKS, OF NEW YORK, N. Y., A CORPORATION OF NEW YORK.

GLASS COMPOSITION.

No Drawing.   Application filed October 10, 1923. Serial No. 667,679.

Boric oxide is capable of replacing silica when glasses free from silica are desired, but such substitution requires radical changes in the percentages used of other constituents, for boric oxide when used in quantities necessary to effect such substitution tends to reduce the stability of glasses to chemical attack, and to cause devitrification.

This invention has for its object to provide an improved silica free glass, or glass practically free from silica, having a good stability for such a glass, and having but little tendency to devitrification. The following are examples of compositions of glasses falling within my invention.

|         | I. | II. | III. | IV. | V. | VI. |
|---------|----|-----|------|-----|----|----|
| $B_2O_3$ | 67 | 65  | 60   | 55  | 50 | 65 |
| $Al_2O_3$ | 15 | 20  | 15   | 20  | 30 | 18 |
| CaO     | 15 | 5   | 20   | 20  | 10 | 10 |
| $K_2O$  | 3  | 10  | 5    | 5   | 10 | 4  |
| $Na_2O$ |    |     |      |     |    | 3  |

It will be noted that none of the above preferred compositions contain over 10% of alkali (which would seriously impair stability); that calcium oxide is used as the oxide of the second periodic system to the exclusion of magnesia (which tends to devitrification) although magnesia and zinc oxide may replace some of the lime; that the alkali in most of them is in the form of potash, instead of soda; and that relatively large quantities of alumina are present.

In melting such a glass, care must be taken that no large quantity of silica is absorbed in the melting. This can be avoided in practice by using a tank constructed of block of carefully selected material, melting the glass at as low a temperature as possible, and keeping the tank walls as cool as possible. With proper precaution the melted glass will contain less than one per cent silica, and even as low as one-tenth of one per cent. For purposes of this case I regard any glass having less than 5% silica as a glass substantially free from silica.

Having thus described my invention what I claim is:—

1. A glass substantially free from silica, and containing boric oxide, alumina, an oxide of a second group element, and not over 10% alkali, of which more than one-half is potassium oxide.

2. A glass substantially free from silica and containing not more than 65% boric oxide, not less than 15% alumina, an oxide of a second group element, and not over ten per cent of an alkali.

3. A glass substantially free from silica, and containing between 50 and 57 per cent boric oxide; between 15 and 30% alumina; between 5 and 20 per cent of oxides of the second group of the periodic system, the major part of such last named oxides being calcium oxide, and between 5 and 10% of alkali, the major part of the alkali being in the potassium oxide.

In testimony whereof I hereunto affix my signature.

WILLIAM CHITTENDEN TAYLOR.